United States Patent
Takebayashi (10) Patent No.: US 7,761,212 B2
(45) Date of Patent: Jul. 20, 2010

(54) WIRELESS COMMUNICATION APPARATUS

(75) Inventor: Haruyuki Takebayashi, Sakai (JP)

(73) Assignee: Shimano Inc., Osaka (JP)

(*) Notice: Subject to any disclaimer, the term of this patent is extended or adjusted under 35 U.S.C. 154(b) by 204 days.

(21) Appl. No.: 12/054,020

(22) Filed: Mar. 24, 2008

(65) Prior Publication Data

US 2009/0240858 A1    Sep. 24, 2009

(51) Int. Cl.
G06F 7/00 (2006.01)
G06F 3/00 (2006.01)
A63B 22/06 (2006.01)

(52) U.S. Cl. .............................. 701/51; 482/57; 710/15

(58) Field of Classification Search ................ 701/51; 710/104–106, 15, 18, 19; 482/8, 57
See application file for complete search history.

(56) References Cited

U.S. PATENT DOCUMENTS

| | | | | |
|---|---|---|---|---|
| 4,509,044 A | * | 4/1985 | Yachida | 345/204 |
| 5,170,161 A | * | 12/1992 | Sakurai | 340/870.3 |
| 5,177,432 A | * | 1/1993 | Waterhouse et al. | 324/166 |
| 6,192,300 B1 | * | 2/2001 | Watarai et al. | 701/1 |
| 6,724,299 B2 | * | 4/2004 | Takeda et al. | 340/432 |
| 6,779,401 B2 | * | 8/2004 | Montagnon | 73/489 |
| 7,454,966 B2 | * | 11/2008 | Fujioka et al. | 73/146.5 |
| 7,548,203 B2 | * | 6/2009 | Kalliola et al. | 342/418 |
| 2002/0075940 A1 | | 6/2002 | Haartsen | |
| 2003/0104848 A1 | | 6/2003 | Brideglall | |
| 2004/0189722 A1 | * | 9/2004 | Acres | 345/866 |
| 2007/0042867 A1 | * | 2/2007 | Lin | 482/8 |
| 2008/0125288 A1 | * | 5/2008 | Case | 482/1 |

FOREIGN PATENT DOCUMENTS

| | | |
|---|---|---|
| EP | 0402620 | 12/1990 |
| EP | 1545069 | 6/2005 |
| JP | 3-12798 | 1/1991 |
| JP | 2004-328502 | 11/2004 |
| JP | 2004-336210 | 11/2004 |
| JP | 2005-39632 | 2/2005 |
| WO | WO 2006023816 | 3/2006 |

* cited by examiner

Primary Examiner—Mark Rinehart
Assistant Examiner—Trisha Vu
(74) Attorney, Agent, or Firm—Ditthavong Mori & Steiner, P.C.

(57) ABSTRACT

A wireless communication apparatus including a master unit and a slave unit. The master unit includes a transmitter configured to transmit a beacon periodically and a receiver. A detector is provided that is configured to output a detected signal, and the slave unit is configured to receive the detected signal from the detector. The slave unit includes a receiver configured to receive the beacon periodically at a receiving timing determined based on the beacon, and a transmitter configured to transmit the detected signal to the master unit receiver at a transmitting timing determined based on the beacon if a value of the detected signal changes by a threshold amount.

16 Claims, 8 Drawing Sheets

WIRELESS COMMUNICATION APPARATUS

BACKGROUND OF THE INVENTION

1. Field of the Invention

The present invention relates to wireless communication apparatuses that communicate between a master unit and a slave unit.

2. Discussion of the Background

Cycle computers are used to display riding information such as bicycle speed and riding distance. For example, such a cycle computer can include a rotation sensor and a parameter display device, wherein the rotation sensor outputs rotation signals in accordance with the rotation of a wheel, and the riding parameter display device displays bicycle speed and riding distance in response to the output rotation signals.

It is also known to transmit the rotation signals wirelessly from the rotation sensor to the display device, as is evident from a review of Japanese unexamined patent application publication 3-12798. The device described therein includes a display unit and a signal generating unit for generating the rotation signals. The display unit and the signal generating unit each operate using a battery as the power source. Since a battery is used as the power source for the various components, once the battery is expended, the device does not operate until the battery is replaced. Thus, due to the limited amount of power supply available for the device, improvements are needed to conserve the power supply.

SUMMARY OF THE INVENTION

In an aspect of the present invention, a wireless communication apparatus is advantageously provided that includes a master unit and a slave unit, as defined below. The master unit includes a transmitter configured to transmit a beacon periodically and a receiver. A detector is provided that is configured to output a detected signal, and the slave unit is configured to receive the detected signal from the detector. The slave unit includes a receiver configured to receive the beacon periodically at a receiving timing determined based on the beacon, and a transmitter configured to transmit the detected signal to the master unit receiver at a transmitting timing determined based on the beacon if a value of the detected signal changes by a threshold amount.

In another aspect of the present invention, a wireless communication apparatus is advantageously provided that includes a master unit and a slave unit, as defined below. The master unit includes a transmitter configured to transmit a beacon periodically and a receiver. A detector is provided that is configured to output a detected signal. The slave unit is configured to wake up periodically, and the slave unit is configured to receive the detected signal from the detector. The slave unit includes a receiver configured to receive the beacon, and a transmitter configured to transmit the detected signal to the master unit receiver at a transmitting timing determined based on the beacon. A wakeup control unit is provided that is configured to prohibit the slave unit from waking up if a value of the detected signal does not change by a threshold amount.

In a further aspect of the present invention, a wireless communication apparatus is advantageously provided that includes a master unit and a slave unit, as defined below. The master unit includes means for transmitting a beacon periodically, and means for receiving a signal. A means for outputting a detected signal is provided. The slave unit is configured to receive the detected signal from the means for outputting. The slave unit includes means for receiving the beacon at a receiving timing determined based on the beacon, and means for transmitting the detected signal to the means for receiving of the master unit at a transmitting timing determined based on the beacon if a value of the detected signal changes.

BRIEF DESCRIPTION OF THE DRAWINGS

A more complete appreciation of the invention and many of the attendant advantages thereof will become readily apparent with reference to the following detailed description, particularly when considered in conjunction with the accompanying drawings, in which.

DETAILED DESCRIPTION OF EMBODIMENTS OF THE INVENTION

Embodiments of the present invention will be described hereinafter with reference to the accompanying drawings. In the following description, the constituent elements having substantially the same function and arrangement are denoted by the same reference numerals, and repetitive descriptions will be made only when necessary.

Figure 1:
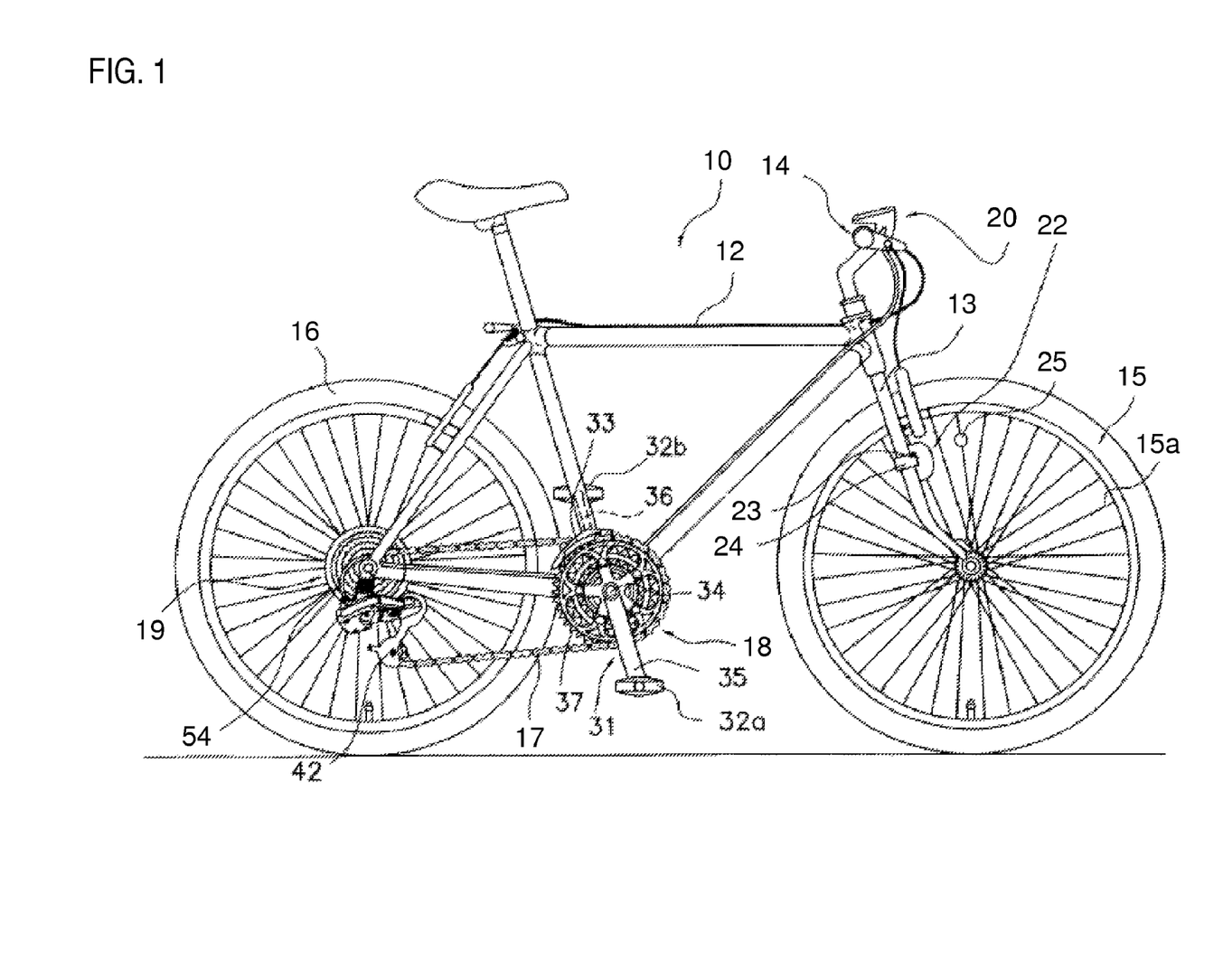
FIG. 1 is a side view of a bicycle that includes a wireless communication apparatus, according to an exemplary embodiment of the present invention.

FIG. 1 is a side view of an exemplary embodiment of a bicycle 10. Bicycle 10 includes a frame 12, a front fork 13 rotatably mounted to frame 12, a handlebar assembly 14 mounted to the upper part of front fork 13, a front wheel 15 rotatably attached to the lower part of front fork 13, a rear wheel 16 rotatably attached to the rear of frame 12, a chain 17, a front transmission 18 disposed at the lower middle portion of frame 12, and a rear transmission 19 disposed at the rear of frame 12.

Front transmission 18 transmits the pedaling force generated by a rider to the rear transmission 19 via the chain 17. The front transmission 18 includes a plurality of sprockets (e.g., three, etc.) 37 of various sizes and a front derailleur 33. The three sprockets 37 are installed on a gear crank 31 that is rotated when the rider pushes pedals 32a and 32b. The gear crank 31 includes a crankshaft 34 that passes horisontally and rotatably through the central lower part of frame 12, a right crank 35, and a left crank 36. The front derailleur 33 engages the chain 17 with one of the three sprockets 37 and can be operated by a control cable connected to a shift control device mounted on the handlebar assembly 14 in a known manner.

The rear transmission 19 serves to transmit the driving force of chain 17 to rear wheel 16. The rear transmission 19 includes a rear sprocket cluster 54 and a rear derailleur 42. In this embodiment, the rear sprocket cluster 54 includes a plurality of sprockets 54a-54g (see FIG. 2A) of different sizes that are mounted concentrically with the hub portion of rear wheel 16. The rear derailleur 42 engages chain 17 with one of the sprockets 54a-54g and can be operated by a control cable connected to a shift control device mounted on the handlebar assembly 14 in a known manner.

The bicycle 10 can include one or more sensors that are used to monitor the status of the bicycle. The bicycle 10 includes a cycle computer 20 that is mounted to the handlebar assembly 14 so that the rider can view a display of the cycle computer and monitor the status of the bicycle 10.

One example of a sensor that can be used to monitor the status of the bicycle is a rotation sensor 22 that can be used to monitor speed of the bicycle and distance traveled by the bicycle. In this embodiment, the rotation sensor 22 includes a housing 23 that is mounted to the front fork 13 using a mounting band 24. The rotation sensor 22 detects the passage of a magnet 25 mounted by a screw or some other device to a spoke 15a of the front wheel 15. Using dimensions of the bicycle and mounting configuration of the sensor 22, as well as the number and frequency of the sensing signals sent by the sensor 22 to the cycle computer 20, the cycle computer can calculate information regarding the status of the bicycle, such as the speed of the bicycle and the distance traveled by the bicycle. Alternatively, the rotation sensor could be mounted to a rear frame member, and the magnet mounted to a spoke of the rear wheel 16. Further alternatively, the rotation sensor could be mounted to a central frame member, and the magnet mounted to the right crank 35 or the left crank 36.

Another example of a sensor that can be used to monitor the status of the bicycle is a sensor provided within either or both of the front derailleur 33 or the rear derailleur 42 to monitor the operating position of the respective derailleur. Such sensors would provide an accurate assessment of the operating position of the derailleur(s), which would provide an accurate indication of the gear in which the bicycle is currently in.

FIGS. 2A-2D will be used to describe an exemplary embodiment of such a derailleur sensor, which in this embodiment is incorporated into the rear derailleur 42. In this embodiment, a rear sprocket cluster 54 is provided that includes a plurality of rear sprockets 54a-54g that are mounted to the rear wheel 16 for rotating with rear wheel 16. The rear derailleur 42 is mounted to frame 12 in close proximity to the rear sprocket cluster 54 for moving chain 17 among the plurality of rear sprockets 54a-54g.

Figure 2A:
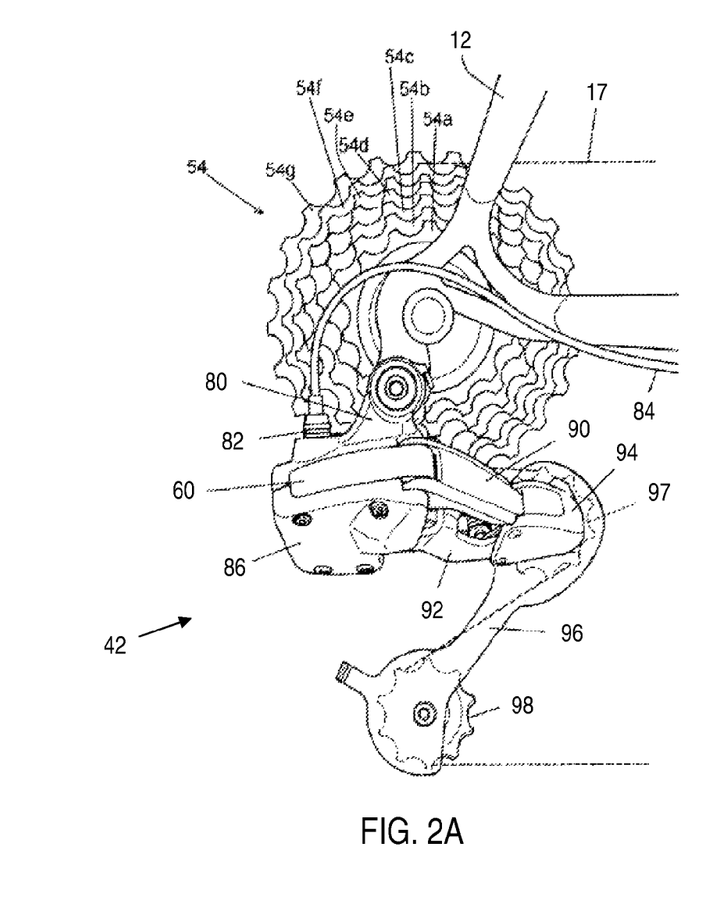
FIG. 2A is an enlarged view of a rear derailleur and sprocket assembly of the bicycle shown in FIG. 1.
Figure 2B:
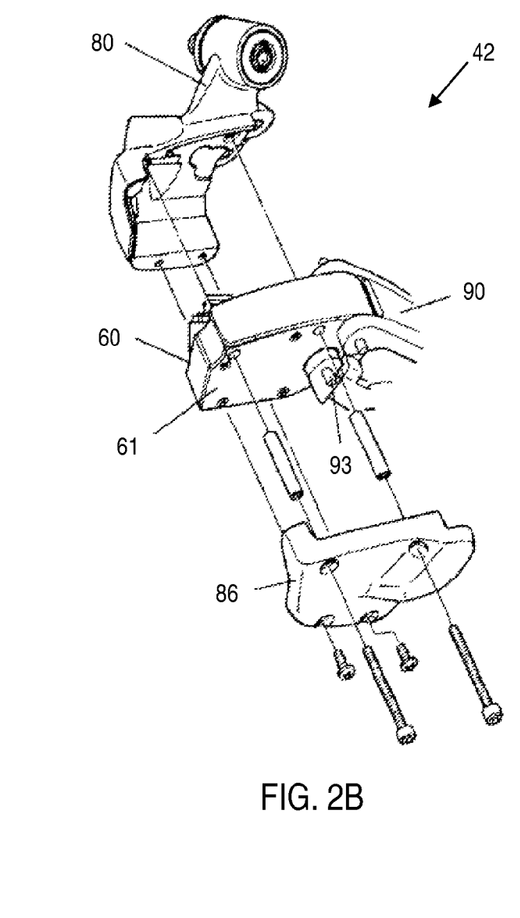
FIG. 2B is a partially exploded view of the rear derailleur shown in FIG. 2A.

The rear derailleur 42 includes a control housing 60 is mounted between a base member 80 and an outer cover 86 of rear derailleur 42. Base member 80 is swingably mounted to frame 12 in a known manner, and it can include an electrical connector 82 for connecting to a connector on an intermediate communication path 84. The rear derailleur 42 further includes link members 90 and 92 pivotably coupled to rear derailleur control housing 60, wherein link member 92 is nonrotatably fixed to pivot shaft 93 by a flat. The other ends of link members 90 and 92 are pivotably coupled to a movable member 94 through respective pivot shafts. Movable member 94 rotatably supports a chain guide 96 which, in turn, rotatably supports a guide pulley 97 and a tension pulley 98 for engaging chain 17 in a known manner. As discussed in more detail below, a motor 62 within housing 60 rotates pivot shaft 93 for causing link member 92 to move movable member 94 and chain guide 96 laterally for transferring chain 17 among the plurality of rear sprockets 54a-54g.

Figure 2C:
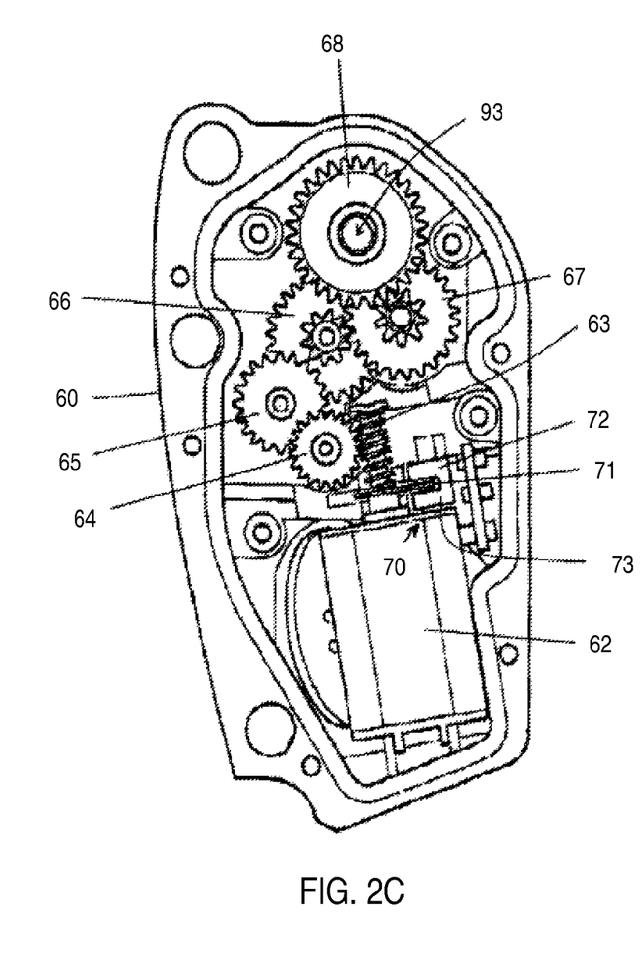
FIG. 2C is a view of a control housing including a position sensor and other components therein of the rear derailleur shown in FIGS. 2A and 2B.

FIG. 2C is a view illustrating the contents of rear derailleur control housing 60 with rear derailleur control housing cover 61 removed. As shown in FIG. 2C, motor 62 includes a pinion drive shaft 63 that drives pivot shaft 93 through a gear reduction mechanism comprising gears 64-68, wherein a small diameter gear portion of each gear 64-67 drives a larger diameter gear portion of the next gear in the power transmission path. Gear 68 rotates integrally with pivot shaft 93. A digital signal providing mechanism in the form of a digital position sensor 70 is mounted in rear derailleur control housing 60. The digital position sensor 70 includes an intermittent optical sensor that in includes a shutter wheel 71 that rotates integrally with pinion drive shaft 63, a light source such as LED 72 disposed on one side of shutter wheel 71, and a light detector such as a phototransistor 73 disposed on the other side of shutter wheel 71. Rotation of shutter wheel 71 with pinion drive shaft 63 causes the passage of light from LED 72 to phototransistor 73 to be intermittently blocked, thus producing a digital signal having a period determined by the rate of rotation of shutter wheel 71. Thus, the shape of the digital signal typically will be square or rectangular depending upon the operation condition. Thus, digital position sensor 70 functions as an intermittent optic sensor in this embodiment.

Figure 2D:
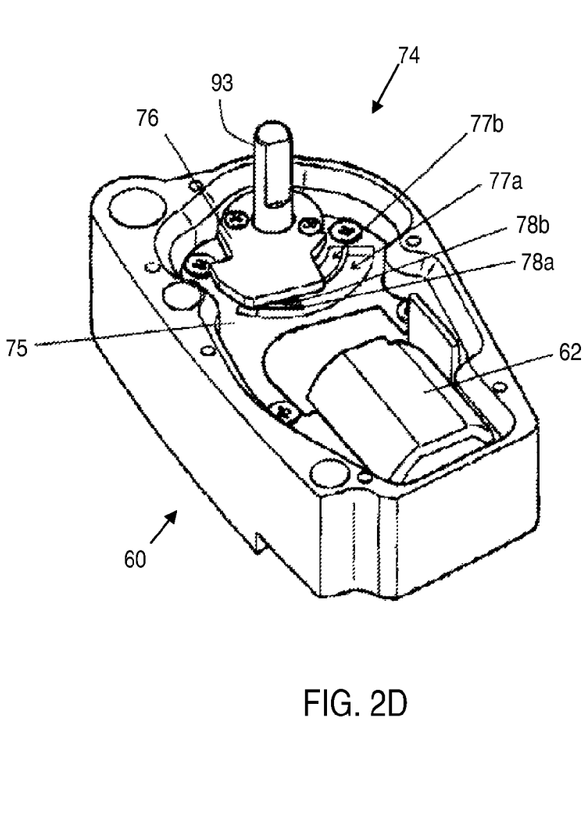
FIG. 2D is a view of the control housing of FIG. 2C with an additional position sensor shown thereon.

As shown in FIG. 2D, an analog signal providing mechanism in the form of an analog position sensor 74 also is mounted in rear derailleur control housing 60. Analog position sensor 74 includes a potentiometer that includes a contact plate 75 and a brush plate 76. Contact plate 75 is mounted to rear derailleur control housing 60, and it includes resistive contacts 77a and 77b. Brush plate 76 rotates integrally with pivot shaft 93, and it includes brushes 78a and 78b for contacting resistive contacts 77a and 77b to operate like a potentiometer in a known manner.

U.S. Pat. No. 6,945,888, which is incorporated herein in its entirety, provides additional details regarding such a rear derailleur.

A processor within the cycle computer 20 or provided within the rear derailleur 42 itself can then determine the proper signals for driving motor 62 using the signals received from digital position sensor 70 and analog position sensor 74 in conjunction with a gear selection made by the rider using the gear shift on the handlebar assembly 14. The signals generated by the position sensors 70 and 74 can also be used as an indication of the status of the gear in which the rear derailleur 42 is currently engaged and such status can be provided to the rider via the display of the cycle computer 20.

Similarly, position sensor(s) can be incorporated into the front derailleur 33 in order to provide the rider with the current front gear engagement status via the display of the cycle computer 20.

Figure 3:
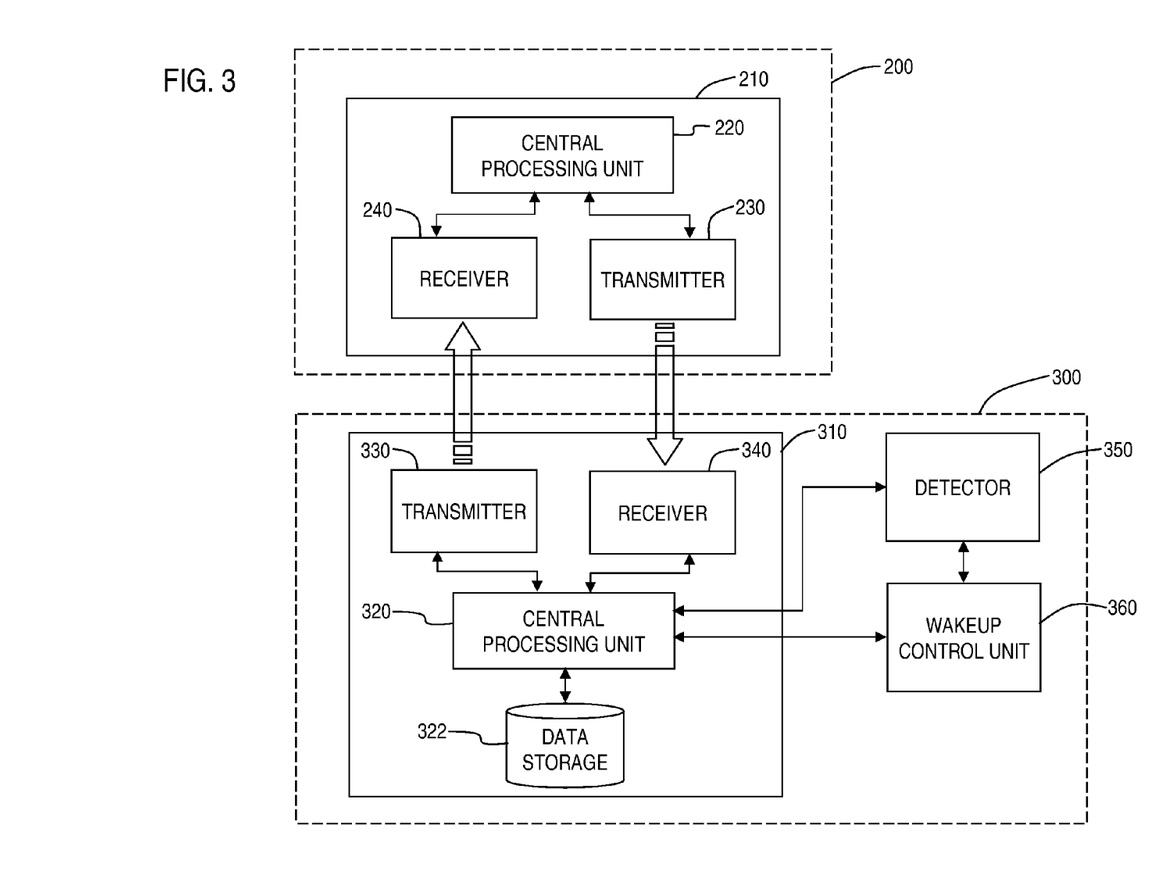
FIG. 3 is a schematic view of a wireless communication apparatus including a master unit and a slave unit, according to an exemplary embodiment of the present invention.

FIG. 3 depicts an embodiment of a wireless communication apparatus that can be use to send status signals of any type between a master unit 210 and a slave unit 310, where the slave unit 310 detects and/or receives detection signals regarding, for example, status of a bicycle. Thus, a detector 350, which can either be incorporated as part of the slave unit or can be connected thereto (as shown), is provided on the bicycle to perform a type of status detection that can be sent to the master unit 210 for display to and use by the rider via interface unit 200 (e.g., a cycle computer, such as cycle computer 20 discussed above). The detector 350 can be, for example, a rotation sensor (e.g., rotation sensor 22 discussed above), a position sensor (e.g., digital position sensor 70 and/or analog position sensor 74 discussed above) that can be used to detect gear engagement selection of a front and/or rear derailleur, or any other type of sensor on the bicycle that can provide useful bicycle status information to the rider.

As shown in FIG. 3, the master unit 210 is preferably incorporated within an interface unit 200, such as a cycle computer, that preferably includes a display for the rider and various user input selection features. The master unit 210 includes a central processing unit (CPU) 220 that is connected to a transmitter 230 that is configured to send various signals and a receiver 240 that is configured to receive various signals. Although not depicted, the master unit 210 also includes a power source. The CPU 220 is configured to communicate with (i.e., send and receive signals from) and control both the transmitter 230 and the receiver 240.

As will be apparent to one of skill in the art, the interface unit 200 can also include, in addition to or in conjunction with the master unit 210, a processor for processing information in communication with a bus or other mechanism for communicating information among various computing components. The interface can include a main memory, such as a random access memory (RAM) or other dynamic storage device and a read only memory (ROM) or other static storage device, coupled to the bus for storing information and instructions to be executed by the processor. A display and user input device can also be coupled via the bus for communicating information and command selections amongst the components.

The slave unit 310 is preferably incorporated within a detection unit 300, which can include a housing mounted to the bicycle or can be incorporated in or partially incorporated in a bicycle component such as the bicycle component that is being monitored by the detection unit. The slave unit 310 includes a central processing unit (CPU) 320 that is connected to a transmitter 330 that is configured to send various signals and a receiver 340 that is configured to receive various signals. The CPU 320 is connected with a data storage unit 322. The CPU 320 is configured to communicate with (i.e., send and receive signals from) and control both the transmitter 330 and the receiver 340. Additionally, one or more detectors are provided, such as detector 350 that is in communication with the CPU 320. Further, a wake-up control unit 360 is preferably provided that is in communication with the CPU 320 and the detector 350. Note that the wake-up control unit 360 can alternatively be provided as part of the slave unit 310. Although not depicted, the detection unit 300, and/or various components thereof, can also include a power source(s).

The transmitter 230 of the mater unit 210 is configured to send wireless signals (e.g., various radio frequency signals, or other types of wireless signals) that can be received by the receiver 340 of the slave unit 310, and the transmitter 330 of the slave unit 310 is configured to send wireless signals that can be received by the receiver 240 of the master unit 210. However, in order to conserve power, transmitter 230 is not in constant communication with the receiver 340, and the transmitter 330 is not in constant communication with receiver 240, but rather these devices are in an operational state for predetermined periods of time at given intervals with sleep periods in which the devices are in a non-operational state therebetween. By maximizing the periods of sleep for a unit (e.g., the slave unit 310) or a component in the unit, the power supply (e.g., battery) of the unit or component can be conserved.

Figure 4:
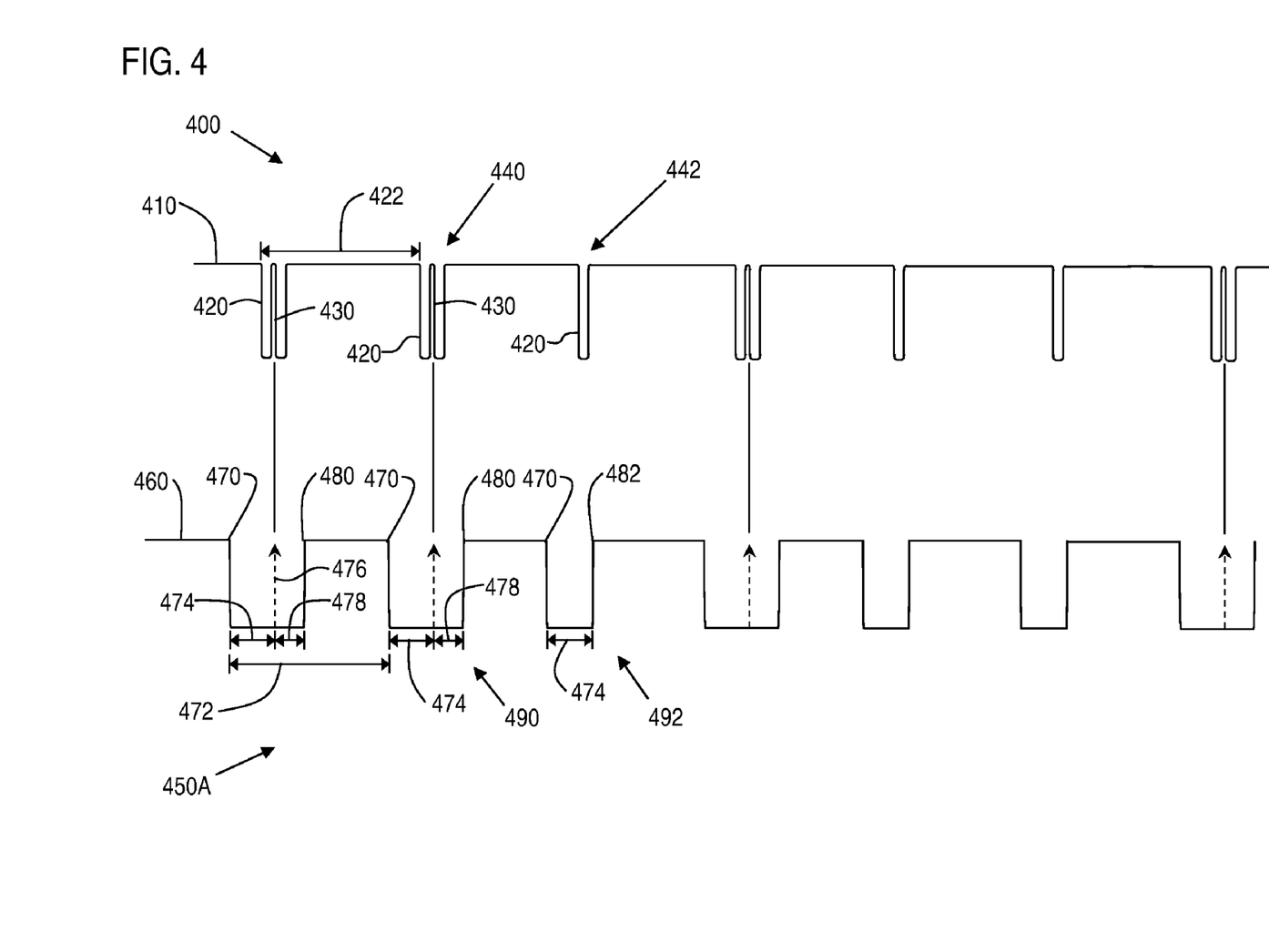
FIG. 4 is an output signal timeline for a master unit transmitter, and a corresponding sleep/wake timeline for a slave unit, according to an exemplary embodiment of the present invention.

FIG. 4 depicts an output signal timeline 400 for the transmitter 230 of the master unit 210, and a corresponding sleep/wake timeline 450A for the slave unit 310. The output signal timeline 400 includes rest or sleep periods 410 (i.e., all portions of the timeline 400 that are horizontally aligned with the period labeled as 410 in FIG. 4) with periodic intervals where an output signal is transmitted by the transmitter 230 of the master unit 210 to the receiver 340 of the slave unit 310. More specifically, transmitter 230 of the master unit sends an output signal or beacon 420 to the receiver 340 at regular intervals 422 (e.g., every second, every 5 seconds, every 10 seconds, every minute, etc.) using a clock or timer of the CPU 220. If the receiver 240 of the master unit 210 does not receive a signal from the transmitter 330 of the slave unit 310 in response to the beacon 420, then the master unit 210 (e.g., the CPU 220, transmitter 230, and/or receiver 240) goes into a rest or sleep period, such as period 410, as can be seen at reference number 442. If, however, the receiver 240 of the master unit 210 does receive a signal 476 from the transmitter 330 of the slave unit 310 in response to the beacon 420, then the transmitter 230 of the master unit 210 outputs a confirmation signal 430 that confirms receipt of the signal 476 by the receiver 240, and then the master unit 210 goes into the rest or sleep period, as can be seen at reference number 440.

The sleep/wake timeline 450A for the slave unit 310 includes sleep periods 460 (i.e., all portions of the timeline 450A that are horizontally aligned with the period labeled as 460 in FIG. 4) with periodic intervals where the slave unit 310 is awake. The sleep periods represent periods where one, plural, or all components of the slave unit 310 are in a non-operational (or deactivated, or powered off, etc.) state in order to conserve the power supply of the slave unit 310. Thus, beginning on the left side of the timeline 450A, the slave unit 310 is in a sleep mode in period 460, and at point 470 the slave unit 310 wakes up (i.e., changes to an operational state, or becomes active, or is powered on, etc.). The wakeup points 470 occur at regular intervals 472 (e.g., every second, every 5 seconds, every 10 seconds, every minute, etc.) using a clock or timer of the CPU 320 or wakeup control unit 360. The intervals 422 are preferably equal to the intervals 472; however, due to differences between the clock/timer of CPU 220 and the clock/timer of CPU 320 or wakeup control unit 360, deviations in the intervals 422 and 472 may occur, as will be discussed in greater detail with respect to FIG. 7 below.

After the wakeup point 470, the slave unit 310 will remain in a wakeup mode for at least a predetermined period of time 474. The period of time 474 is a range of time that is intended to be generally centered around the time at which the slave unit 310 calculates that a beacon 420 should be sent by the master unit 210 and received by the receiver 340. The range of time provided by the period of time 474 is intended to allow for the slave unit 310 to be in a wakeup mode when the master unit 210 sends the beacon 420, even if the timing of the receipt of the beacon 420 by the receiver 340 deviates from the time the slave unit 310 calculates that a beacon 420 should be received by the receiver 340. Thus, the range of time provided by the period of time 474 allows for communication from the master unit 210 to the slave unit 310 despite a certain amount of deviation in timing between sending and receiving of the signal, which can be due to clock/timer differences, transmission delays, etc.

Upon receipt of the beacon 420, the slave unit 310 will determine whether or not to send a signal 476 to the master unit 210. The determination by the slave unit 310 regarding whether or not to send a signal 476 using the transmitter 330 to the master unit 210 will be discussed in detail below. If the transmitter 330 of the slave unit 310 does not send a signal in response to the beacon 420, then the slave unit 310 (e.g., the CPU 320, transmitter 330, and/or receiver 340) goes into a rest or sleep period, such as period 460, at sleep point 480. If, however, the transmitter 330 of the slave unit 310 does send a signal 476 in response to the beacon 420, then the slave unit 310 will remain in the wakeup mode for an additional predetermined period of time 478. The period of time 478 is a range of time that is intended to be generally centered around the time at which the slave unit 310 calculates that the confirmation signal 430 should be sent by the master unit 210 and received by the receiver 340. After the period of time 478 has elapsed (or, alternatively, after actual receipt of the confirmation signal 430), the slave unit 310 goes into a rest or sleep period, such as period 460, at sleep point 482.

Thus, in this exemplary embodiment, two cycles are shown; namely, a first cycle where a signal 476 is sent by the slave unit 310 in response to the beacon 420 and a confirmation signal is sent by the master unit in response to the signal 476, and a second cycle where no signal is sent by the slave unit in response to the beacon and thus no confirmation signal is sent by the master unit. Advantageously, the second cycle provides a reduction in the amount of time the slave unit 310 is in the wakeup mode, thereby reducing the amount of power used by the slave unit 310. FIG. 4 includes (from left to right along the timelines 400 and 450A) two first cycles, followed by one second cycle, followed by one first cycle, followed by two second cycles, followed by one first cycle. Thus, in this exemplary embodiment, since a total of three second cycles are employed, the amount of time that the slave unit 310 is in the wakeup mode is reduced by three times the period of time labeled as period 478, as compared to a system in which all cycles are performed as the first cycle. Additionally, due to the determination by the slave unit 310 to not send a signal in response to the beacon 420 in each of the second cycles, the transmitter 330 does not need to be utilized to send such a signal in these instances, thereby further reducing the power consumption of the slave unit 310. These reductions in power usage will greatly reduce the overall power consumption of the slave unit 310 over a period of extended usage of the detection unit 300.

The determination regarding whether or not to send a signal 476 from the transmitter 330 to the master unit 210 will be made by the CPU 320 of the slave unit based upon data signals received by the CPU 320 from the detector 350. The detector 350 can be configured to provide a continuous stream of data signals or data signals at given intervals (e.g. every millisecond, every second, etc.) to the CPU 320. The data signals sent from the detector 350 to the CPU 320 represent sensor output data related to the status of the bicycle, and the interface unit 200 includes a processor that is configured to analyze the data signals and provide the rider with the status of the bicycle based on the data signals (e.g., receive a data signal from the rotation sensor 22 and provide the rider with the speed of the bicycle and the distance traveled by the bicycle). The CPU 320 receives the data signals from the detector 350 and stores the data signals in the data storage 322.

The CPU 320 analyzes two or more (e.g., a plurality of data signals collected over a predetermined range of time) data signals from the detector 350 and determines whether a threshold change in bicycle status has occurred based on a comparison of the data signals under analysis. If a threshold change has occurred, then the CPU 320 determines that a data signal (preferably the most recent data signal) will be sent as signal 476 from the transmitter 330 to the master unit 210 in response to the receipt of the beacon 420. If a threshold change has not occurred, then the CPU 320 determines that a data signal will not be sent from the transmitter 330 to the master unit 210 in response to the receipt of the beacon 420, and in this instance, the master unit 210 will assume that no threshold change has occurred if no signal is received by the receiver 240 following the sending of the beacon 420.

The threshold change used to determine whether a data signal is sent from the slave unit 310 to the master unit 210 can be defined based on the type of bicycle status that the data signal represents, and the precision of the status desired versus the power conservation desired. For example, if the data signal represents the shifting of a gear in the rear derailleur, then the threshold change is preferably defined as a change from one gear to any other gear. Thus, if a gear shift has occurred, then the threshold change has been met and a data signal is sent from the slave unit 310 to the master unit 210, which indicates such a gear shift. If, however, the data signal represents the speed of the bicycle from a rotation sensor, then the threshold change can be set to a value range (e.g., a change in speed of ±1 mile per hour, a change in speed of ±2 miles per hour, etc.), where the smaller the value range, the greater the accuracy of the status and the greater the power consumption due to a greater likelihood of signals being sent from the slave unit 310 to the master unit 210. With data signals that represent distance travelled, the threshold change can also be set to a value range (e.g., every 0.01 mile, every 0.1 miles, etc.).

Figure 5:
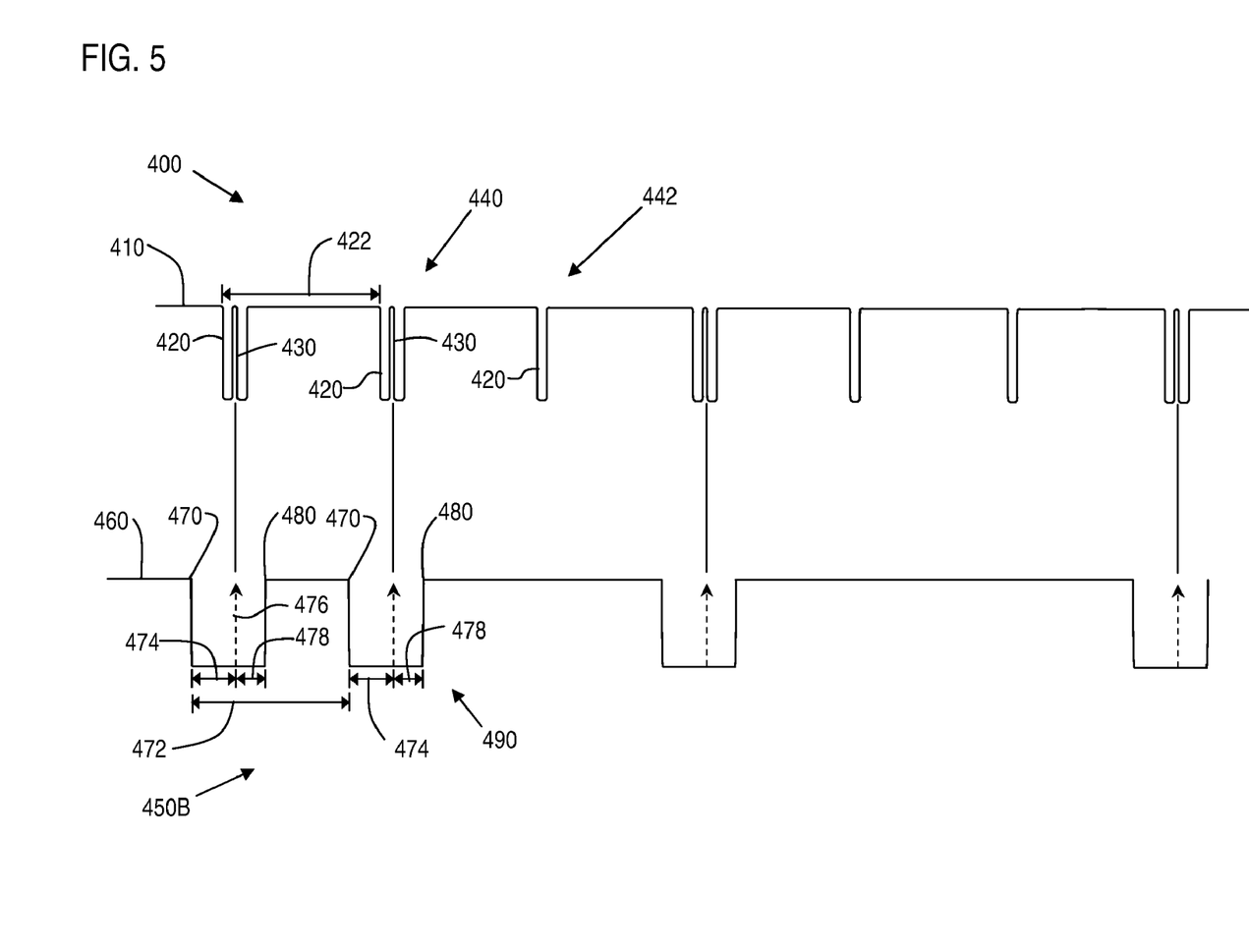
FIG. 5 is an output signal timeline for a master unit transmitter, and a corresponding sleep/wake timeline for a slave unit, according to another exemplary embodiment of the present invention.

FIG. 5 depicts an output signal timeline 400 for the transmitter 230 of the master unit 210, and a corresponding sleep/wake timeline 450B for the slave unit 310, according to another exemplary embodiment. The output signal timeline 400 is the same as in FIG. 4; however, the sleep/wake timeline 450B differs from the timeline 450A in the following respects. According to the sleep/wake timeline 450B, the slave unit 310 remains in the sleep mode during each cycle unless and until the CPU 320 of the slave unit 310 determines that a threshold change in bicycle status has occurred based on the data signals from the detector 350. If no threshold change has occurred, then the slave unit 310 remains in the sleep mode to further conserve power. Thus, at each cycle (e.g., at the start of or just prior to each interval 472), the CPU 320 performs the threshold change determination, and if a threshold change has occurred, the slave unit 310 will go into the wakeup mode for period 474 to receive the beacon 420 and for period 478 to receive the confirmation signal 430.

In the embodiment depicted in FIG. 5, the wakeup control unit 360 can be used to determine whether a threshold change in bicycle status has occurred based on data signals from the detector 350, instead of CPU 320. Thus, the wakeup control unit 360 will collect and analyze data signals from the detector 350 and calculate whether such a threshold change has been met, thereby allowing the CPU 320 to be shut off during sleep mode. When the wakeup control unit 360 determines that a threshold change has occurred, then the wakeup control unit 360 can turn on the CPU 320, which can then go into wakeup mode.

Figure 6:
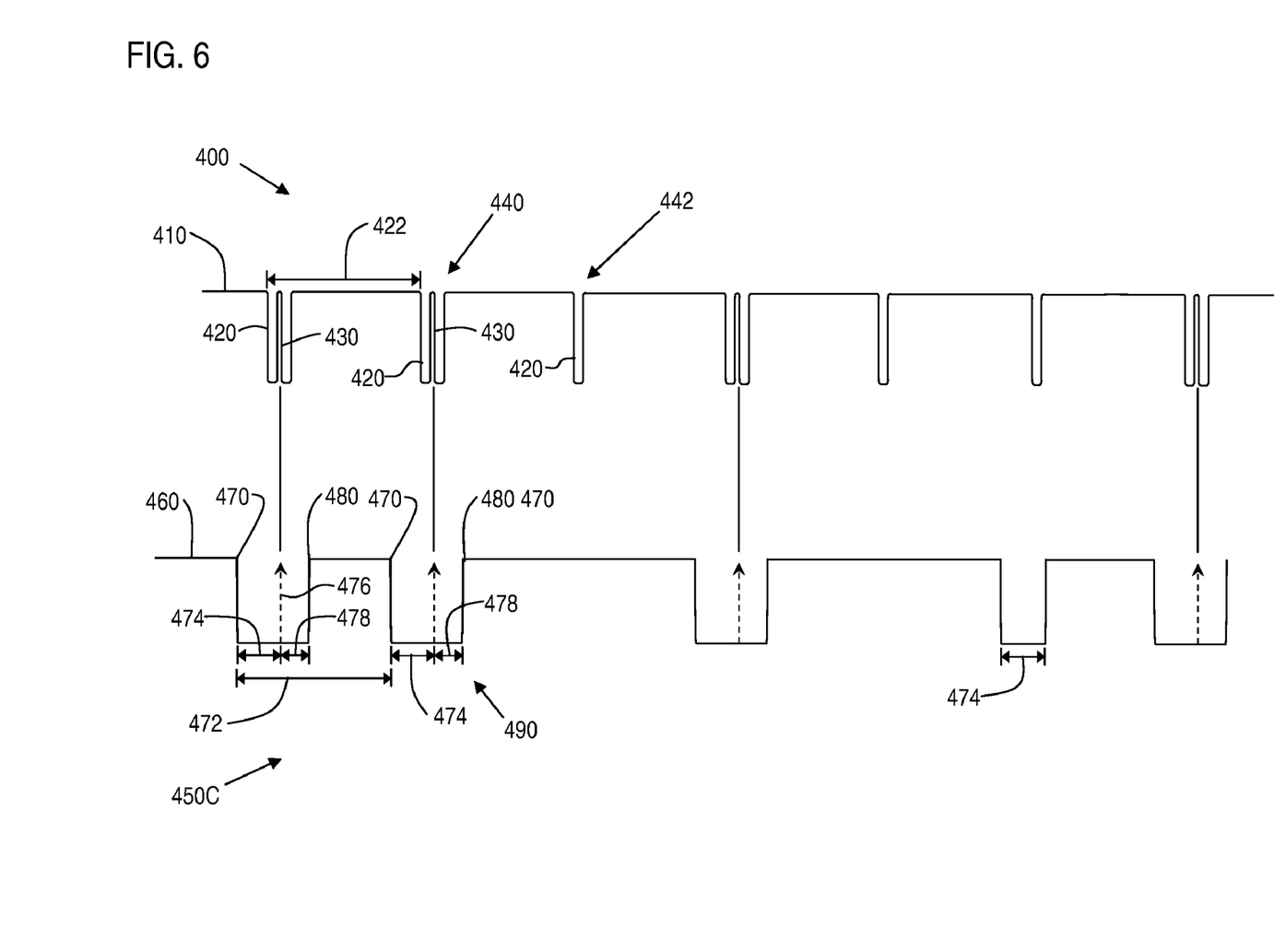
FIG. 6 is an output signal timeline for a master unit transmitter, and a corresponding sleep/wake timeline for a slave unit, according to a further exemplary embodiment of the present invention.

FIG. 6 depicts an output signal timeline 400 for the transmitter 230 of the master unit 210, and a corresponding sleep/wake timeline 450C for the slave unit 310, according to an additional exemplary embodiment. The output signal timeline 400 is the same as in FIG. 4; however, the sleep/wake timeline 450C differs from the timeline 450A in the following respects. According to the sleep/wake timeline 450C, the slave unit 310 remains in the sleep mode during each cycle unless the CPU 320 of the slave unit 310 determines that a threshold change in bicycle status has occurred based on the data signals from the detector 350 and unless a predetermined number of cycles (e.g., intervals 472) have passed since the last wakeup mode. Generally, if no threshold change has occurred, then the slave unit 310 remains in the sleep mode to further conserve power. However, at each cycle, in addition to performing a threshold change determination, the CPU 320 will determine a number of prior consecutive cycles have passed with the slave unit in the sleep mode, if the number exceeds threshold or a predetermined maximum amount (e.g., 1 prior cycle in sleep mode (as in FIG. 6), 2 prior consecutive cycles in sleep mode, etc.) then the slave unit 310 will go into the wakeup mode for period 474 to receive the beacon 420, but, since no threshold change has occurred, no signal 476 will be sent and no period 478 will occur in such an instance.

In the embodiment depicted in FIG. 6, the wakeup control unit 360 can be used to determine whether a threshold change in bicycle status has occurred based on data signals from the detector 350, instead of CPU 320, as discussed with respect to the embodiment in FIG. 5. Additionally, the wakeup control unit 360 can also be used to monitor cycles and determine the number of prior consecutive cycles that have passed with the slave unit in the sleep mode in order to wakeup the slave unit if necessary.

In the embodiment in FIG. 6, the determination regarding a number of prior consecutive cycles that have passed with the slave unit 310 in the sleep mode is performed in order to ensure proper communication between the master unit 210 and the slave unit 310, as will be discussed in greater detail with respect to FIG. 7. Basically, this determination is made in order to ensure that potential timing differences between the timer/clock of the master unit 210 and the timer/clock of the slave unit 310 do not result in the beacon 420 being sent when the slave unit 310, which intends to receive the beacon 420, is in the sleep mode, thus resulting in a failure to receive the beacon at the slave unit.

An example of such a timing difference will be discussed with respect to FIG. 7. FIG. 7 shows a sleep/wakeup timeline for a slave unit in conjunction with a corresponding timeline listing the occurrence of certain events. In FIG. 7, for example, $T_{WAKEUP2}$ represents the time the slave unit goes into the wakeup mode for a second cycle, $T_{B2}$ represents the time the slave unit expects to receive a second beacon from the master unit, $T_{B2}'$ represents the time the slave unit actually receives the second beacon from the master unit, $T_{S2}$ represents the time the slave unit sends a data signal to the master unit, and $T_{SLEEP2}$ represents the time the slave unit goes into the sleep mode in the second cycle. The other cycles are labeled in a similar manner. Further, $R_1$ represents a first time range in which the slave unit is in the wakeup mode to receive a beacon from the master unit, and $R_2$ represents a second time range in which the slave unit is in the wakeup mode to receive a confirmation signal from the master unit following the transmission of a data signal from the slave unit to the master unit. $R_1$ and $R_2$ are preferably set around an expected time of receipt of the beacon and the confirmation signal, respectively (e.g., such that half the time range is before the expected time of receipt and half the time range is after the expected time of receipt). $P_1$ represents a predetermined period of time that is used by the slave unit to determine a time $T_{S1}$ at which to transmit the data signal to the master unit (i.e., a transmitting timing), and $P_1$ begins at time $T_{B1}'$ and is determined using the timer/clock of the slave unit.

Figure 7:
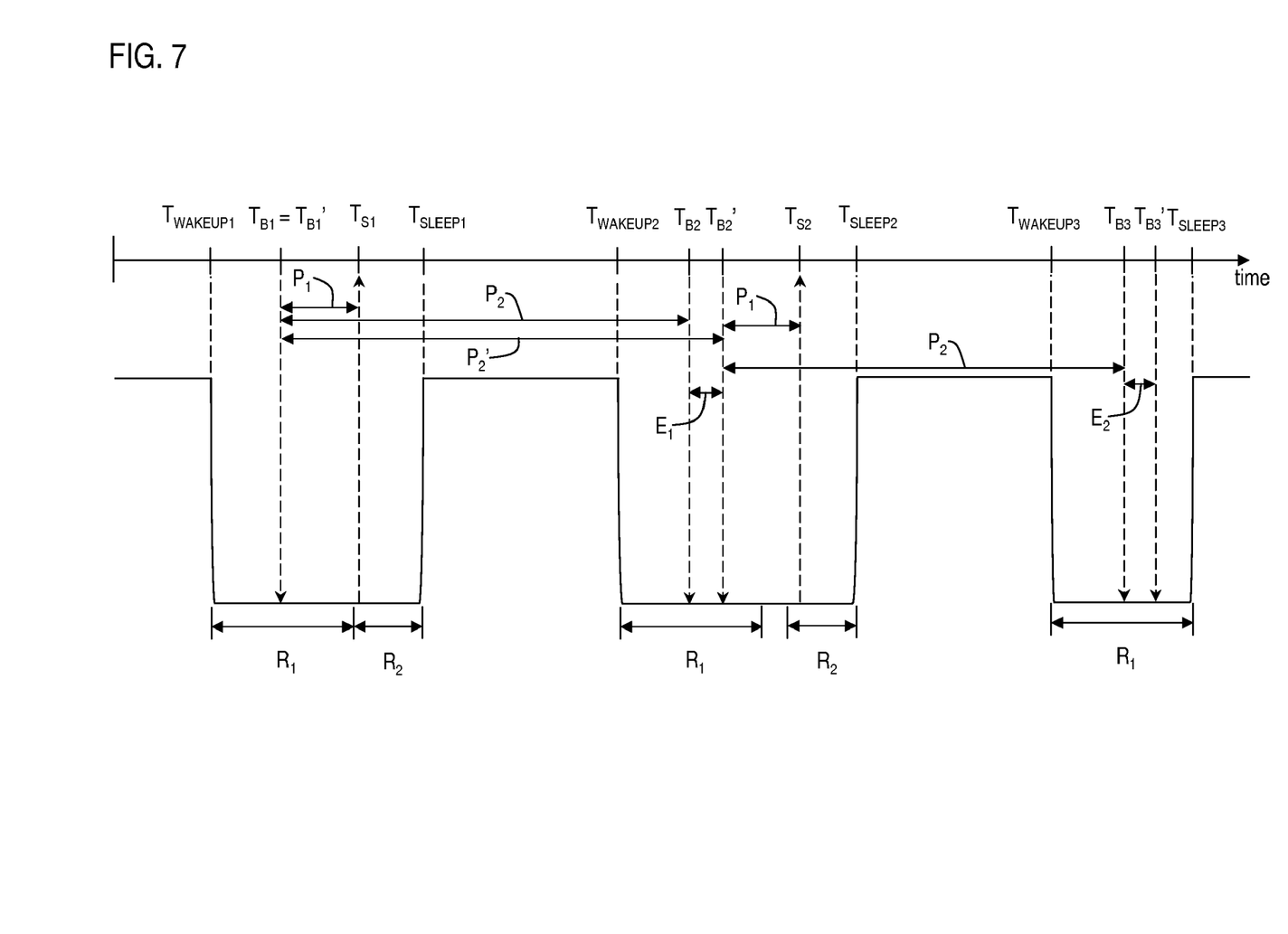
FIG. 7 is a sleep/wakeup timeline for a slave unit in conjunction with a corresponding timeline listing the occurrence of certain events during the communication between a master unit and the slave unit, according to an exemplary embodiment of the present invention.

For ease of explanation, in a first cycle in FIG. 7 it will be assumed that $T_{B1}$ equals $T_{B1}'$. In the first cycle, the master unit sends out a first beacon that is received by the slave unit at $T_{B1}'$. Thereafter, the master unit sends out subsequent beacons at predetermined intervals, and uses a clock/timer thereof to measure the predetermined intervals, which are depicted as intervals $P_2'$. Upon receipt of the first beacon at $T_{B1}'$, the slave unit will expect to receive the next beacon (i.e., the second beacon in this instance) at the same predetermined intervals as the master unit; however, the slave unit uses a clock/timer thereof to measure the predetermined intervals, which are depicted as intervals $P_2$. If $P_2$ equal $P_2'$, then there will not generally be a problem with the transmission and receipt of signals between the master unit and the slave unit; however, if $P_2$ does not equal $P_2'$ due to timing differences between the clock/timer of the master unit as compared to the clock/timer of the slave unit, then problems can occur.

Thus, upon receipt of the first beacon at $T_{B1}'$, the slave unit calculates a receiving timing using $T_{B1}'$, and thereby expects to receive the second beacon at $T_{B2}$ based on $P_2$ and will go into wakeup mode at $T_{WAKEUP2}$ based upon a calculation of half of the range $R_1$ being before $T_{B2}$. However, the master unit actually sends and the slave unit receives the second beacon at $T_{B2}'$, which is in this example is later in time than $T_{B2}$ by a timing error $E_1$.

In order to correct for this timing error, the slave unit uses $T_{B2}'$ to calculate the receiving time and thereby an expected time of receipt of the third beacon at $T_{B3}$ based on $P_2$ (note also that the $P_2$ value could be adjusted to account for timing errors if so desired) and will go into wakeup mode at $T_{WAKEUP3}$ based upon a calculation of half of the range $R_1$ being before $T_{B3}$. Also, the slave unit determines transmitting timing $T_{S2}$ based on $T_{B2}'$. However, in the third cycle, the master unit actually sends and the slave unit receives the third beacon at $T_{B3}'$, which is in this example is later in time than $T_{B3}$ by an error amount $E_2$.

Note that if the timing errors are not taken into account when the slave unit determines expected receipt times of subsequent beacons, then the timing errors will accumulate until the actual receipt time of a subsequent beacon falls outside of the wakeup mode of the slave unit, and the slave unit will therefore not receive the beacon. Since the actual receipt time of the beacon in the slave unit is used to make adjustments to the timing of the wakeup mode of the slave unit, the embodiment of FIG. 6 is used to set a maximum number of consecutive cycles in which the slave unit is in the sleep mode, even if no threshold change of the bicycle status has occurred. Thus, if the maximum number of consecutive sleep mode cycles has been reached, then the slave unit will go into the wakeup mode in order to receive a beacon from the master unit, and then use the actual receipt time of that beacon to determine the expected receipt time of a subsequent beacon (i.e. recalibrate the timing of the slave unit).

It should be noted that the exemplary embodiments depicted and described herein set forth the preferred embodiments of the present invention, and are not meant to limit the scope of the claims hereto in any way. Numerous modifications and variations of the present invention are possible in light of the above teachings. It is therefore to be understood that, within the scope of the appended claims, the invention may be practiced otherwise than as specifically described herein.

What is claimed is:

1. A wireless communication apparatus comprising:
   a master unit comprising:
      a master unit transmitter configured to transmit a beacon periodically; and
      a master unit receiver;
   a detector configured to output a detected signal; and
   a slave unit configured to receive the detected signal from the detector, said slave unit comprising:
      a slave unit receiver configured to receive the beacon periodically at a receiving timing determined based on the beacon; and a slave unit transmitter configured to transmit the detected signal to the master unit receiver at a transmitting timing determined based on the beacon if a value of the detected signal changes by a threshold amount, wherein:

the master unit receiver is configured to receive the detected signal transmitted by the slave unit transmitter;

the master unit transmitter is configured to transmit a confirmation signal in response to receipt of the detected signal by the master unit;

the slave unit receiver is configured to receive the confirmation signal transmitted by the master unit transmitter; and the slave unit is configured to enter a sleep mode after receipt of the confirmation signal.

2. The wireless communication apparatus according to claim 1, wherein the detector is configured to detect a gear shift of a bicycle having a plurality of gears, and wherein the threshold amount is a shift from one gear setting to another gear setting.

3. The wireless communication apparatus according to claim 1, wherein the detector is configured to detect a rotation of a wheel of a bicycle representative of a speed of the bicycle, and wherein the threshold amount is a predetermined amount of change in speed.

4. The wireless communication apparatus according to claim 1, wherein the detector is configured to detect a rotation of a wheel of a bicycle representative of a distance travelled by the bicycle, and wherein the threshold amount is a predetermined amount of distance travelled.

5. The wireless communication apparatus according to claim 1, wherein, if the value of the detected signal does not change by the threshold amount, the slave unit is configured to enter the sleep mode for a period of time including the transmitting timing.

6. A wireless communication apparatus comprising:
a master unit comprising:
a master unit transmitter configured to transmit a beacon periodically; and
a master unit receiver;
a detector configured to output a detected signal;
a slave unit configured to receive the detected signal from the detector, the slave unit being configured to wake up periodically, and the slave unit comprising:
a slave unit receiver configured to receive the beacon; and
a slave unit transmitter configured to transmit the detected signal to the master unit receiver at a transmitting timing determined based on the beacon; and
a wakeup control unit configured to prohibit the slave unit from waking up if a value of the detected signal does not change by a threshold amount, wherein:

the master unit receiver is configured to receive the detected signal transmitted by the slave unit transmitter;

the master unit transmitter is configured to transmit a confirmation signal in response to receipt of the detected signal by the master unit;

the slave unit receiver is configured to receive the confirmation signal transmitted by the master unit transmitter; and the slave unit is configured to enter a sleep mode after receipt of the confirmation signal.

7. The wireless communication apparatus according to claim 6, wherein the detector is configured to detect a gear shift of a bicycle having a plurality of gears, and wherein the threshold amount is a shift from one gear setting to another gear setting.

8. The wireless communication apparatus according to claim 6, wherein the detector is configured to detect a rotation of a wheel of a bicycle representative of a speed of the bicycle, and wherein the threshold amount is a predetermined amount of change in speed.

9. The wireless communication apparatus according to claim 6, wherein the detector is configured to detect a rotation of a wheel of a bicycle representative of a distance travelled by the bicycle, and wherein the threshold amount is a predetermined amount of distance travelled.

10. The wireless communication apparatus according to claim 6, wherein the wakeup control unit is configured to prohibit the slave unit from waking up if the value of the detected signal does not change by the threshold amount unless the slave unit is in the sleep mode for a predetermined maximum number of consecutive periods.

11. The wireless communication apparatus according to claim 10, wherein, when the predetermined maximum number of consecutive periods is reached, the slave unit is configured to wake up so that the slave unit receiver can receive the beacon.

12. The wireless communication apparatus according to claim 11, wherein, after receipt of the beacon, the slave unit is configured to enter the sleep mode for a period of time including the transmitting timing.

13. A wireless communication apparatus comprising:
a master unit comprising:
means for transmitting a beacon periodically; and
means for receiving a signal;
means for outputting a detected signal; and
a slave unit configured to receive the detected signal from the means for outputting, said slave unit comprising:
means for receiving the beacon at a receiving timing determined based on the beacon; and
means for transmitting the detected signal to the means for receiving of the master unit at a transmitting timing determined based on the beacon if a value of the detected signal changes, wherein:

the means for receiving of the master unit is configured to receive the detected signal transmitted by the means for transmitting of the slave unit;

the means for transmitting of the master unit is configured to transmit a confirmation signal in response to receipt of the detected signal by the master unit;

the means for receiving of the slave unit is configured to receive the confirmation signal transmitted by the means for transmitting of the master unit; and the slave unit is configured to enter a sleep mode after receipt of the confirmation signal.

14. The wireless communication apparatus according to claim 13, further comprising means for controlling a wakeup mode and the sleep mode of the slave unit, wherein the means for controlling is configured to have the slave unit in the sleep mode for the transmitting timing if the value of the detected signal does not change.

15. The wireless communication apparatus according to claim 14, wherein the means for controlling is configured to have the slave unit in the sleep mode for the receiving timing if the value of the detected signal does not change.

16. The wireless communication apparatus according to claim 15, wherein the means for controlling is configured to have the slave unit in the wakeup mode for the receiving timing if the slave unit is in the sleep mode for a predetermined maximum number of consecutive periods.

* * * * *